(12) United States Patent
Takata

(10) Patent No.: US 7,537,369 B2
(45) Date of Patent: May 26, 2009

(54) SURFACE RADIATION CONVERSION ELEMENT, LIQUID CRYSTAL DISPLAY DEVICE, AND METHOD OF PRODUCING A SURFACE RADIATION CONVERSION ELEMENT

(75) Inventor: Yoshiki Takata, Taki-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/787,188

(22) Filed: Feb. 27, 2004

(65) Prior Publication Data

US 2004/0228112 A1  Nov. 18, 2004

(30) Foreign Application Priority Data

Feb. 28, 2003 (JP) ............... 2003-053551

(51) Int. Cl.
*F21V 7/04* (2006.01)
(52) U.S. Cl. .................. 362/606; 382/600; 382/615; 382/616; 382/618
(58) Field of Classification Search ................ 362/330, 362/339, 606, 620, 626, 600, 615, 616, 617, 362/618, 619; 349/58, 60, 65, 67, 70
See application file for complete search history.

(56) References Cited

U.S. PATENT DOCUMENTS

| | | | | |
|---|---|---|---|---|
| 5,961,198 A * | 10/1999 | Hira et al. | ............... | 362/621 |
| 6,425,675 B2 * | 7/2002 | Onishi et al. | ............... | 362/607 |
| 6,545,827 B1 | 4/2003 | Okabe et al. | | |
| 7,004,610 B2 * | 2/2006 | Yamashita et al. | .......... | 362/606 |
| 2001/0012158 A1 | 8/2001 | Umemoto et al. | | |
| 2001/0053074 A1 * | 12/2001 | Onishi et al. | .................. | 362/31 |
| 2002/0172810 A1 | 11/2002 | Murata et al. | | |
| 2004/0022050 A1 | 2/2004 | Yamashita et al. | | |

FOREIGN PATENT DOCUMENTS

| | | |
|---|---|---|
| JP | 9-96814 A | 4/1997 |
| JP | 2000-249836 A | 9/2000 |
| JP | 2001-91709 A | 4/2001 |
| JP | 2001-338507 A | 12/2001 |
| JP | 2002-222604 A | 8/2002 |
| JP | 2002-350615 | 12/2002 |
| KR | 2001-0003887 A | 1/2001 |

* cited by examiner

*Primary Examiner*—Jacob Y Choi
(74) *Attorney, Agent, or Firm*—Birch, Stewart, Kolasch & Birch, LLP

(57) ABSTRACT

An object of the present invention is to allow electromagnetic wave, which is radiated from a radiation source, to be radiated efficiently from a radiation surface in a surface radiation conversion element such as, for example, a light-guiding plate. The present invention is a surface radiation conversion element for converting electromagnetic wave, which is radiated from a radiation source, to surface radiation, wherein an element body 101 has a generally plate shape constituted with a material having a larger electric permittivity than outside and, in the inside of the element body 101, a plurality of closed spaces 103 are disposed whose electric permittivity is smaller than that of the material constituting the element body 101 and whose surfaces opposite to the radiation surface 123 are generally flat. The aforesaid closed spaces 103 can be formed with recesses 121 disposed in the first member 110 or the second member 120 constituting the element body 101.

39 Claims, 9 Drawing Sheets

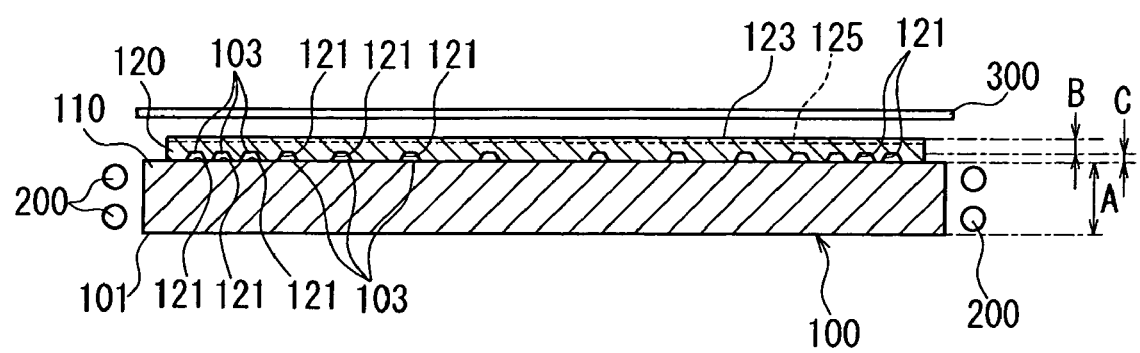
F I G. 1

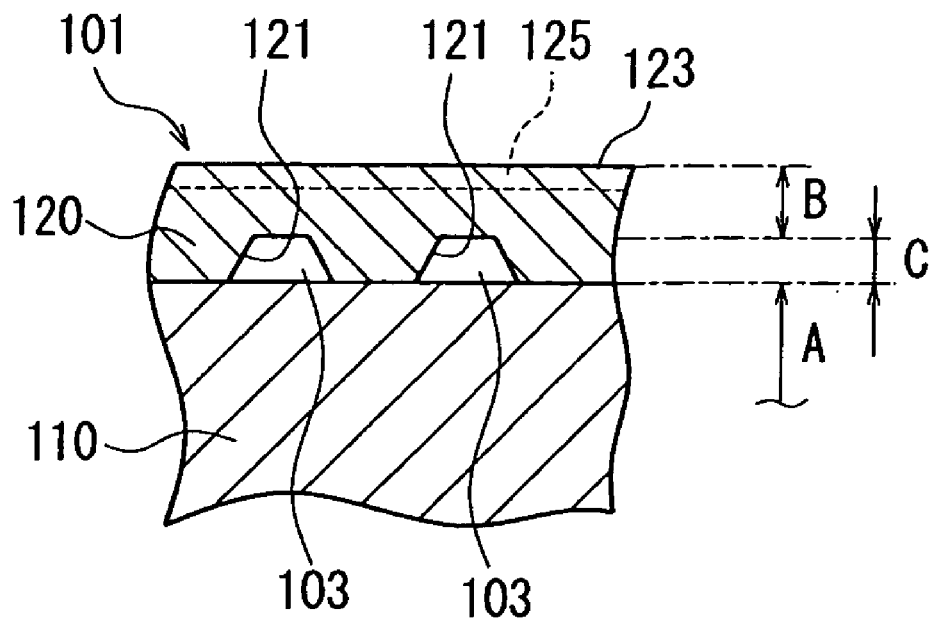
F I G. 2 A
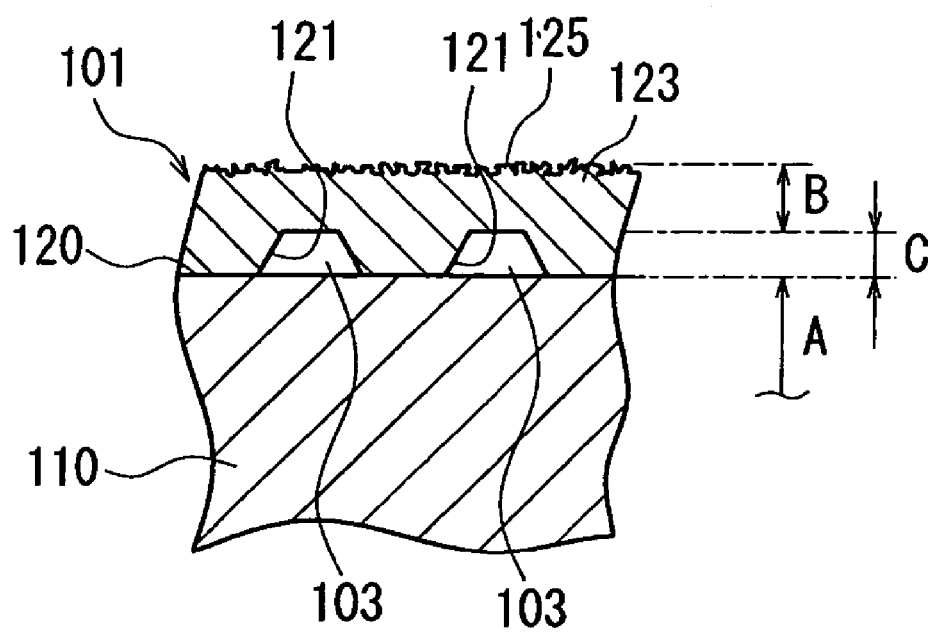
F I G. 2 B

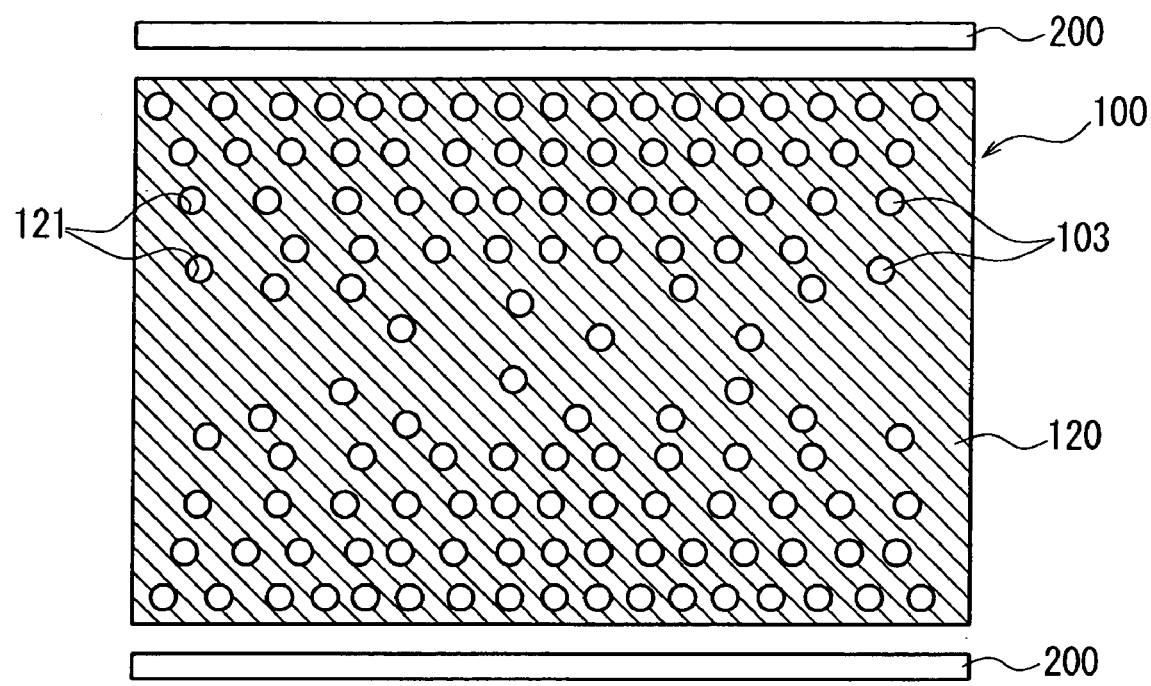
F I G. 3

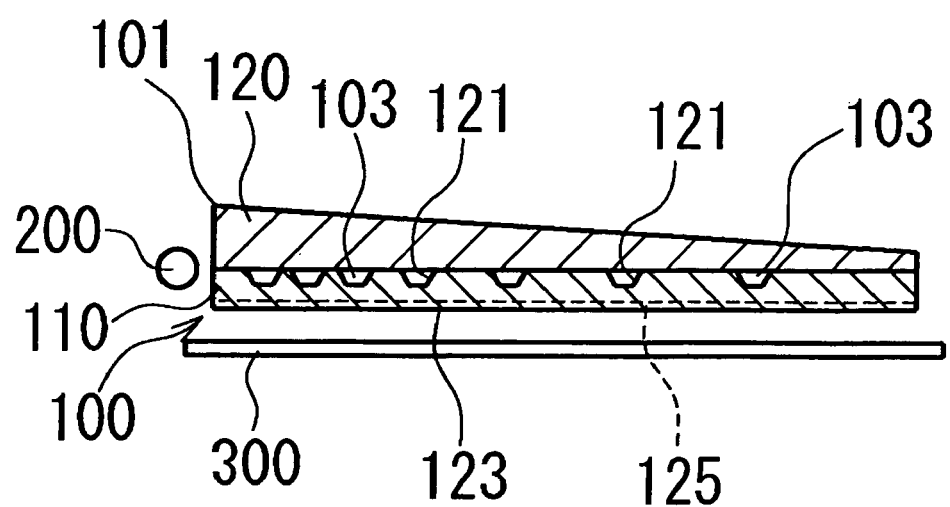
F I G. 7

SURFACE RADIATION CONVERSION ELEMENT, LIQUID CRYSTAL DISPLAY DEVICE, AND METHOD OF PRODUCING A SURFACE RADIATION CONVERSION ELEMENT

TECHNICAL FIELD

This Nonprovisional application claims priority under 35 U.S.C. § 119(a) on Patent Application No(s). 2003-053551 filed in JAPAN on Feb. 28, 2003, the entire contents of which are hereby incorporated by reference.

The present invention relates to a surface radiation conversion element for converting an electromagnetic wave, which is radiated from a radiation source, to surface radiation. More specifically, it is an invention which is used, for example, in a liquid crystal display device and is suitable as a light-guiding plate that converts light, which is radiated from a light source, to surface radiation.

BACKGROUND ART

Hitherto, in a liquid crystal display device, a light-guiding plate, for example, has a light source disposed on a side thereof, has a liquid crystal conversion element mounted on an upper surface thereof, and is used for guiding light, which is radiated from the light source, to a liquid crystal display element.

Here, the light-guiding plate has undergone a treatment such as printing or embossing on a surface opposite to the display surface (light-exiting surface) as shown, for example, in FIG. 11. Then, the light radiated from the light source is scattered at this opposite surface, and only the light that has escaped from the total reflection angle among this scattered light exits from the light-exiting surface. In other words, the light that was unable to escape from the total reflection angle among the scattered light is reflected at the light-exiting surface instead of exiting from the light-exiting surface. Moreover, not all the light that has escaped from the total reflection angle exits at the light-exiting surface. Much of the light is reflected at the light-exiting surface and returns to the inside. In other words, the light that can exit from the light-exiting surface is a component of a slight amount which is a part of the light that has escaped from the total reflection angle among the light that has been scattered at the opposite surface by hitting the printing or embossing. As a result of this, the light is damped due to lengthened optical path by repetition of such reflection till the light exits, thereby raising a problem in that the light from the light source cannot be utilized sufficiently.

Further, in view of the aforesaid problem, there is one in which a light-emitting sheet having a plurality of protrusions is bonded to a surface of a light guide so that the protrusions thereof may be brought into point contact (For example, Japanese Laid-open Patent Publication No. 2000-249836 and Japanese Laid-open Patent Publication No. 2000-338507). In such a light-guiding plate, the light from a light source is introduced into a light-emitting sheet from a light guide via the point contact part, and exits from the light-exiting surface. Now, even in the one disclosed in the patent document 1, the light that cannot escape from the total reflection angle repeats being reflected within the light-emitting sheet, so that the light from the light source cannot be utilized sufficiently. Moreover, in exiting from the light-exiting surface, the light must pass through the point contact part. Since the point contact imposes a fineness limit to the area of the part that can be passed through, the light cannot enter the light-exiting surface and much of the light repeats being reflected in the light guide, so that the problem of the loss of light is not sufficiently solved.

DISCLOSURE OF THE INVENTION

Therefore, an object of the present invention is to provide a surface radiation conversion element that can allow an electromagnetic wave, which is radiated from a radiation source, to be radiated efficiently from a radiation surface.

A characteristic feature of the surface radiation conversion element according to the present invention lies in that, in a surface radiation conversion element for converting electromagnetic wave, which is radiated from a radiation source, to surface radiation, an element body has a generally plate shape constituted with a material having a larger electric permittivity than outside and, in the inside of the element body, a plurality of closed spaces are disposed whose electric permittivity is smaller than that of the material constituting the element body and whose surfaces opposite to a radiation surface are generally flat. This allows that the electromagnetic wave radiated from the radiation source to the element body passes through the part other than the closed spaces in the inside of the element body to the radiation surface side and is radiated from the radiation surface. Thus, since the electromagnetic wave passes through the part other than the closed spaces to the radiation surface side, more electromagnetic wave passes to the radiation surface side as compared with the one in which the light passes through the point contact part, such as the conventional one in which a light-emitting sheet is bonded to a light guide surface so that the protrusions thereof may be brought into point contact (for example, Japanese Laid-open Patent Publication No. 2000-249836. Therefore, the path of the electromagnetic wave can be accurately shortened, and the electromagnetic wave from the radiation source can be efficiently radiated. Further, by changing the number or the size of the closed spaces in accordance with the planar position, the amount of radiation at each planar position can be accurately controlled. In other words, by reducing the number of closed space parts, for example, in accordance with the distance from the radiation source, uniform surface radiation can be realized. Further, since the closed spaces have a generally flat surface on the side opposite to the radiation surface, random reflection is less liable to occur at this surface, so that the amount of radiation at each planar position can be accurately controlled.

Here, one example of the electromagnetic wave is light, and one example of the surface radiation conversion element is a light-guiding plate. Also, the aforementioned radiation source may be made of one radiation source or may be made of a plurality of radiation sources and, further, it may be any of the one performing point radiation, the one performing line radiation, and the one performing surface radiation.

Furthermore, it is preferable to adopt a construction in which a plurality of closed spaces are disposed whose surfaces opposite to said radiation surface are generally parallel to the radiation surface. This allows that the reflection at the surface on the opposite side can be easily controlled, and the amount of radiation at each planar position can be accurately controlled.

Furthermore, it is preferable to adopt a construction in which a plurality of closed spaces are adjacently disposed whose surfaces opposite to said radiation surface are generally parallel to each other. This allows that the reflection at the surface on the opposite side can be easily controlled, and the amount of radiation at each planar position can be accurately controlled.

Furthermore, the surface radiation conversion element according to the present invention can be constructed with various members. However, it is preferable to adopt a construction in which a first member having a radiation source disposed on a side thereof and a second member disposed on the radiation surface side are constituted to be in close adhesion, and said closed spaces are formed between the first member and the second member. Further, in this case, it is preferable that at least one member of the first member and the second member has recesses formed therein, and said recesses are disposed to constitute said closed spaces by joining the first member and the second member. By adopting such a construction, it can be produced easily, thereby reducing the production costs. Here, it is possible to adopt a construction in which said recesses are formed only in the first member and not in the second member, a construction in which said recesses are formed only in the second member and not in the first member, or a construction in which said recesses are formed both in the first member and in the second member.

Furthermore, it is preferable to adopt a construction in which a total reflection restraining layer such as a scattering layer is disposed in said radiation surface. This allows that the electromagnetic wave that has reached the radiation surface from the radiation source is scattered at the total reflection restraining layer, so that even the electromagnetic wave that has not escaped from the total reflection angle is radiated from the radiation surface, thereby achieving an improvement in the efficiency of using electromagnetic wave from a radiation source.

Further, suitable change in design can be made such as disposing said closed spaces so that the inside of said closed spaces will be gas layers such as air layers, liquid layers, or the like. However, it is preferable that the closed spaces are filled with solid layers having a smaller electric permittivity than the material constituting the element body. This provides an advantage of being excellent in mechanical strength as compared with the case in which the closed spaces are air layers. Further, in the case of adopting a construction in which the closed spaces are formed between the first member and the second member that are bonded in close adhesion, the area of close adhesion between the first member and the second member will be wide, thereby providing an advantage of being more excellent in mechanical strength.

Further, a characteristic feature of the method of producing a surface radiation conversion element according to the present invention lies in that a plurality of recesses are formed in a joining surface of at least one member of a first member and a second member having a generally equal electric permittivity, and closed spaces having a smaller electric permittivity than the first member and the second member are formed with said recesses by joining the first member and the second member at the surface having the recesses formed therein.

According to the production method having the aforesaid construction, a surface radiation conversion element can be easily produced in which the electromagnetic wave from a radiation source can be efficiently radiated. In other words, in a surface radiation conversion element produced by this method, the electromagnetic wave radiated from a radiation source to the first member passes from the first member to the second member through a part other than the closed spaces constituted with recesses, and is radiated from the radiation surface of the second member. Here, it is possible to adopt a method in which said recesses are formed only in the first member and not in the second member, a method in which said recesses are formed only in the second member and not in the first member, or a method in which said recesses are formed both in the first member and in the second member. Also, as a method for forming recesses in the first member or in the second member, one can adopt a technique of forming recesses at the time of molding with a mold such as a metal mold, a technique of adding a layer to form recesses on a surface of a member having a smooth surface, a technique of forming recesses by transcribing the shape of a mold having protrusions onto a member with the use of heat or pressure, or the like technique. By using the aforesaid techniques, it can be produced easily.

Further, as the production method according to the present invention, there may be various methods; however, it is preferable to adopt a method in which the first member is constituted with a plate material such as an acrylic plate, the second member is constituted with a sheet member such as a scattering sheet containing polycarbonate as a principal material, and said first member and said second member are joined by adhesion. This allows that, by bonding the first member made of a plate material and the second member made of a sheet member, a surface radiation conversion element having closed spaces can be produced easily.

Furthermore, the production method according to the present invention is preferably such that the recesses are formed in one member of the first member and the second member, and a joining surface of the other member to which the one member having said recesses formed therein is joined is formed to be generally coplanar.

In the surface radiation conversion element produced by the production method having such a construction, the surfaces of the plurality of formed closed spaces on the joining side are formed to be generally parallel to each other and generally coplanar. For this reason, the reflection at the surface on this joining side can be easily controlled, and the amount of radiation at each planar position can be accurately controlled.

Furthermore, in the production method according to the present invention, it is preferable that a total reflection restraining layer such as a scattering layer is formed in a surface of the second member opposite to the joining surface. This allows that, in the produced surface radiation conversion element, the electromagnetic wave that has reached the radiation surface from the radiation source is scattered at the total reflection restraining layer, so that even the electromagnetic wave that has not escaped from the total reflection angle is radiated from the radiation surface, thereby achieving an improvement in the efficiency of using electromagnetic wave from a radiation source.

Furthermore, in the production method according to the present invention, although suitable change in design can be made such as disposing the closed spaces so that the inside of the closed spaces constituted with recesses will be gas layers such as air layers or liquid layers, it is preferable that the recesses are filled with solid layers having a smaller electric permittivity than the first member and the second member before the first member and the second member are joined. This provides an advantage of being excellent in mechanical strength in the produced surface conversion element because the closed spaces are filled with solid layers and, moreover, the joining area between the first member and the second member will be wide, thereby providing an advantage of being more excellent in mechanical strength.

BRIEF DESCRIPTION OF THE DRAWINGS

FIG. 1 is a side view partly containing a cross section for describing an outline of the liquid crystal display device according to one embodiment of the present invention;

FIG. 2 is an enlarged view of an essential part of FIG. 1;

FIG. 3 is a cross-sectional plan view for describing an array of closed spaces (recesses) of the embodiment;

FIGS. 5, 6, 7, 8, 9, and 10 are each a side view partly containing a cross section for describing an outline of the liquid crystal display device according to another embodiment.

BEST MODE FOR CARRYING OUT THE INVENTION

Figure 4A:
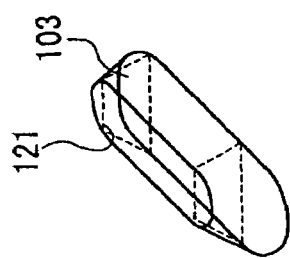
FIG. 4 is a perspective view for describing the shape of the closes spaces (recesses) that can be adopted in the embodiment.

First, a schematic construction of the liquid crystal display device according to this embodiment shown in FIG. 1 will be described. This liquid crystal display device is a liquid crystal display device of a so-called back light type in which a light source 200 is disposed as a radiation source on a side of a light-guiding plate 100, and a liquid crystal display panel 300 having a transmittance mode is mounted on an upper surface of light-guiding plate 100. Here, suitable change in design can be made such as disposing a reflecting means such as a reflecting sheet on the bottom side of light-guiding plate 100 or allowing an optical sheet to intervene between light-guiding plate 100 and liquid crystal display panel 300.

Further, in this embodiment, light source 200 is constituted with cold cathode ray tubes disposed on both sides of light-guiding plate 100; however, a point light source such as a LED can be adopted as light source 200. Also, although a plurality of (two) tubes are arranged in parallel in light source 200 on one side in the illustrated example, light source 200 can be constituted with one tube.

Further, light-guiding plate 100 of this embodiment is for converting light (electromagnetic wave), which is radiated from light source 200, to surface radiation, and letting it exit from light-exiting surface 123 (radiation surface). Light-guiding plate body 101 (element body) has a generally plate shape constituted with a material having a larger refractive index (electric permittivity) than the outside air layer. Further, a plurality of closed spaces 103 are disposed in the inside of this light-guiding plate body 101.

Further, said light-guiding plate 100 is sectioned into a first region A (light-guiding region) in which light exits from light source 200, a second region B (light-exiting region) including said light-exiting surface 123, and a third region C (passage region) for letting the light pass through from said first region A to the second region B. Said closed spaces 103 are disposed in the third region C. Further, a total reflection restraining layer 125 for restraining the total reflection of light is disposed in the light-exiting surface 123 positioned in said second region B.

More specifically, light-guiding plate body 101 is constructed in such a manner that a first member 110 having light sources 200 disposed on both sides thereof and a second member 120 having a light exiting surface 123 are bonded in close adhesion. Then, a plurality of recesses 121 are formed in one surface of the second member 120. Further, closed spaces 103 are constituted with recesses 121 by joining the second member 120 with the first member 110 in close adhesion at the surface having the recesses 121 formed therein. In other words, said first region A is constituted with the first member 110, and said third region C is constituted with the layer of the second member 120 in which the recesses 121 are formed, and said second region B is constituted with the light-exiting surface 123 side of the second region B of the second member 120.

Further, said first member 110 is constituted with a plate member and is constituted, for example, with an acrylic light guide. Further, the second member 120 is constituted with a sheet member and is constituted, for example, with a diffusing sheet containing polycarbonate as a base. Further, since the first member 110 and the second member 120 are made of materials having a generally similar refractive index, light-guiding plate body 101 has a generally similar refractive index in all the regions A, B, C from the first to the third.

Further, the joining surface of the first member 110 for joining with the second member 120 is formed to be coplanar and, for this reason, the bottom surfaces (surfaces opposite to light-exiting surface 123) of the plurality of closed spaces 103 formed with recesses 121 of the second member 120 are disposed to be parallel to each other and coplanar. Furthermore, since said second member 120 is disposed to have a generally uniform thickness, the bottom surfaces of closed spaces 103 are disposed to be generally parallel to said light-exiting surface 123.

Further, the upper surfaces (surfaces on the light-exiting surface 123 side) of the plurality of closed spaces 103 (recesses 121) are disposed to be parallel to each other and coplanar, and are disposed to be generally parallel to said light-exiting surface 123 and to the bottom surfaces of closed spaces 103.

Figure 4B:
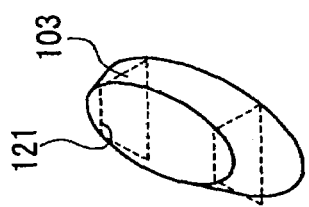
Figure 4C:
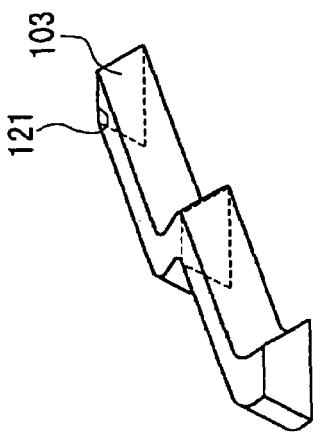
Figure 4D:
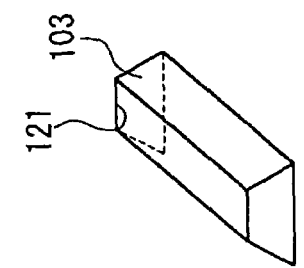

Further, the upper surfaces of closed spaces 103 are disposed to be narrower than the bottom surfaces of closed spaces 103. More specifically, closed spaces 103 are formed to have a generally trapezoidal cross section in which the bottom surface is narrower than the upper surface. Here, in the illustrated example, the cross section of closed spaces 103 is formed to have a trapezoidal shape in which the oblique sides thereof are slanted at a generally equal angle in the directions that are different from each other. Here, the shape of closed spaces 103 of this embodiment is disposed to be generally circular in plan view (upper and bottom surfaces are circular) (See FIG. 3). Here, in the present invention, various shapes can be adopted as the shape of closed spaces 103 (recesses 121). Further, even in the case of forming the closed spaces 103 (recesses 121) to have a trapezoidal cross section, various shapes can be adopted. In other words, one can adopt a shape having a line part and an arc part in plan view as shown in FIG. 4A, an elliptic shape in plan view as shown in FIG. 4B, a shape having a curved line in plan view as shown in FIG. 4C, or a shape having a rectangular shape in plan view as shown in FIG. 4D.

Furthermore, the closed spaces 103 are disposed to have a smaller refractive index than the material constituting the light-guiding plate body 101. Specifically, one can make a construction by bonding the first member 110 and the second member 120 in close adhesion in a state in which air is let to intervene in said recesses 121 so that the closed spaces 103 will be air layers, or make a construction by allowing solid layers having a lower refractive index than the material constituting the light-guiding plate body 101 to intervene in said recesses 121 so that the closed spaces 103 will be filled with the solid layers.

Further, as a technique for forming said recesses 121, one can adopt a technique in which the recesses 121 are formed in the second member 120, for example, at the time of molding with a mold having a plurality of protrusions, a technique of adding a layer for forming recesses to a smooth sheet, a technique of transcribing the shape of a mold having a plurality of protrusions onto a sheet by applying heat or pressure to the sheet, or the like technique.

Further, the plurality of recesses 121 (closed spaces 103) are disposed as shown in FIG. 3 in plan view, and are disposed so that the number of recesses 121 will be smaller (more sparse) near the central part than near the sides where the light sources 200 are disposed.

Further, in said second member 120, the aforesaid total reflection restraining layer 125 is formed in the light-exiting surface 123 which is the surface other than said joining surface. Here, the total reflection restraining layer 125 can be constructed with a diffusing layer (See FIG. 2A) subjected to a process of diffusing light or with a roughened layer (See FIG. 2B) obtained by roughening the surface of the second member 120. Furthermore, the total reflection restraining layer 125 can be constructed with a prism-processed layer intended for the purpose of restraining the total reflection at the surface of the second member 120, for the purpose of controlling the light-exiting angle characteristics, and for the like purpose. Here, in the case of forming the diffusing layer, suitably selectable methods are a method of mixing a diffusing agent into the light-exiting surface side at the time of molding the second member 120 and a method of bonding a diffusing agent onto the surface of the second member 120.

Here, suitable change in design can be made such as performing a printing process, an embossing process, or a prism process on the bottom surface of light-guiding plate 100 (surface opposite to light-exiting surface 123), namely, on the bottom surface of the first member 110 for the purpose of aiding or adding the optical characteristics.

Next, a method of producing the above-described light-guiding plate will be schematically described.

First, a plate-shaped first member 110 constituted, for example, with an acrylic light guide and a sheet-shaped second member 120 constituted, for example, with a diffusing sheet containing polycarbonate as a base are prepared. Here, a plurality of recesses 121 are formed beforehand in the joining surface of the second member 120. The recesses 121 are formed to be wider on the opening side coining surface side). Also, the joining surface of the first member 110 is disposed to be coplanar.

The surface of the second member 120 having recesses 121 formed therein is bonded by adhesion onto the joining surface of the aforesaid prepared first member 110. Here, in bonding, one can adopt a method of using, for example, ultraviolet-curing resin as an adhesive and bonding the two by radiating ultraviolet ray to this.

Here, in bonding, one can beforehand dispose solid layers having a higher refractive index than the first member 110 and the second member 120 in recesses 121 of said second member 120.

In a liquid crystal display device having light-guiding plate 100 made with the above-described construction, the light from light source 200 passes through light-guiding plate 100 and is radiated from light-exiting surface 123 of light-guiding plate 100 towards liquid crystal display panel 300.

In the passage of the light through light-guiding plate 100, the light from light source 200 passes from the first region A (first member 110) of light-guiding plate 100 through the third region C (lower layer of the second member 120) and exits from light-exiting surface 123 of the second region B. In this manner, in light-guiding plate 100, the light passes through the part other than the closed spaces 103 in the third region C to the second region B side. Therefore, compared with those in which the light passes through the point-contact part as in the prior art, the light passes accurately to the light-exiting surface 123 side, whereby the optical path can be shortened and the light from light source 200 can be efficiently radiated. Further, compared with the conventional ones in which the two are in point contact, the joining area between the first member 110 and the second member 120 will be wider, so that the bonding strength of the two is high, thereby, providing an advantage of enhanced mechanical strength. Further, by disposing the solid layers in recesses 121, it provides an advantage of more enhanced mechanical strength.

Further, since total reflection restraining layer 125 is disposed in light-exiting surface 123 of the second region B (second member 120), the light that has reached the light-exiting surface 123 is scattered at the total reflection restraining layer 125, and even the light that does not escape from the total reflection angle exits from the light-exiting surface 123, thereby achieving an improvement in the efficiency of using the light from light source 200.

Furthermore, since the plurality of recesses 121 (closed regions 103) are disposed so that the number thereof will be smaller at the central part than near the sides that are closer to light sources 200, the light near the central part is more liable to pass to the second region B side than the light near the sides, thereby enabling uniform surface radiation from light-exiting surface 123.

Further, a part of the light that passes through the first region A is reflected downwards at the bottom of closed spaces 103. Since the bottom of closed spaces 103 is disposed to be flat, random reflection does not occur, and the light can be controlled easily. Further, the bottoms of the plurality of closed spaces 103 are disposed to be parallel to each other and coplanar, thereby providing an advantage in that the control is further made easier.

Furthermore, a part of the light is reflected at light-exiting surface 123 of the second region B, and the reflected light is reflected at the upper surface of closed spaces 103. Since the upper surface of closed spaces 103 is disposed to be flat, random reflection does not occur, and the light can be controlled easily. Further, the upper surfaces of the plurality of closed spaces 103 are disposed to be parallel to each other and coplanar, thereby providing an advantage in that the control is further made easier.

Here, since this embodiment adopts the above-described construction, the above-described advantage is provided. However, the present invention is not limited to the construction of the above-described embodiment, and suitable change in design can be made within the scope intended by the present invention.

In other words, the aforesaid embodiment has been described by raising light as one example of electromagnetic wave; however, instead of this, it can be used for surface radiation of X-ray or the like.

Further, in the present invention carded out for a general electromagnetic wave, the phase of the members constituting the surface radiation conversion element is not limited to a crystal or amorphous state such as solid or liquid, and suitable changes in design can be made.

Figure 5:
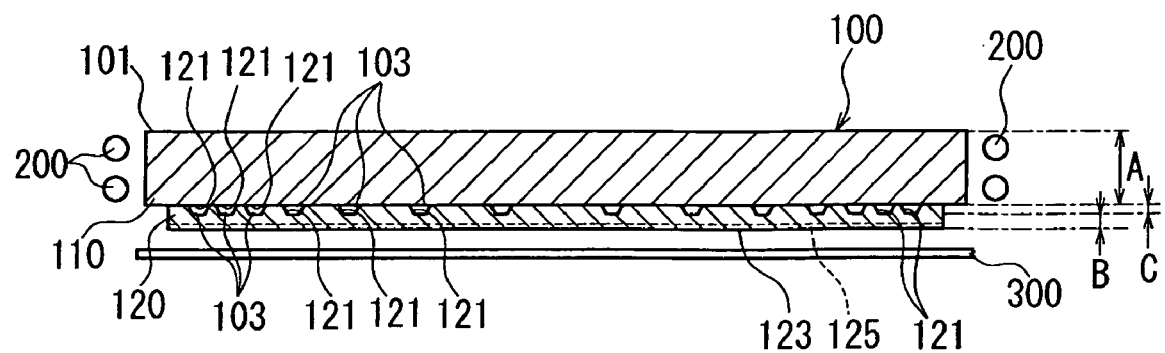

Furthermore, even in the case of using it in a liquid crystal display device as in the above-described embodiment, it can be used, for example, for a liquid crystal display device of a so-called front light type as shown in FIG. 5. In the liquid crystal display device shown in FIG. 5, light sources 200 are disposed on both sides of light-guiding plate 100, and liquid crystal display panel 300 having a reflection mode is mounted on the lower surface of light-guiding plate 100. In other words, light-exiting surface 123 of the light-guiding plate is disposed on the bottom side and, in the illustrated example, the upper side and the bottom side in the description of the aforesaid embodiment are the bottom side and the upper side, respectively. Here, an embossing process, a roughening process, a prism process, or the like can be performed on the upper surface (surface opposite to light-exiting surface 123) of the light-guiding plate 100 shown in FIG. 5.

Figure 6:
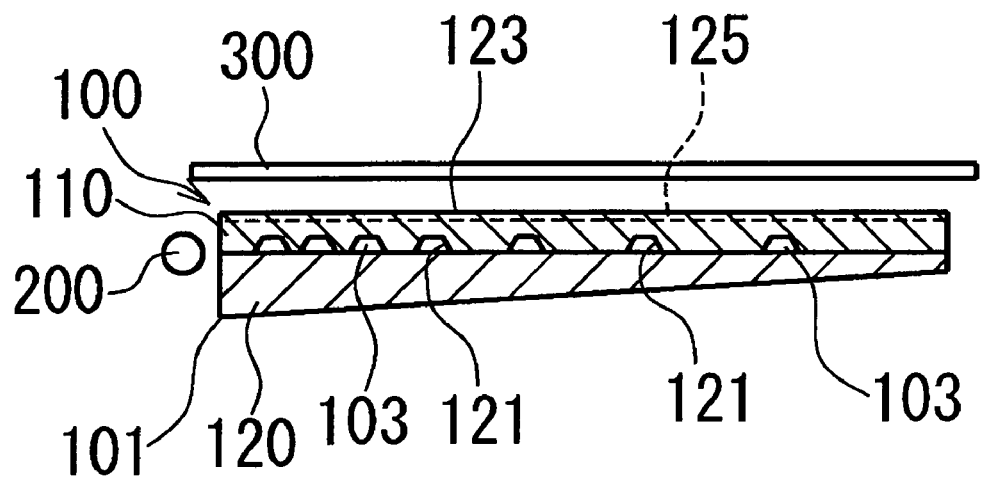

Also, in the aforesaid embodiment, the one in which light sources 200 are disposed on both sides of light-guiding plate 100 has been described. However, those in which light source 200 is disposed only on one side of light-guiding plate 100 such as shown, for example, in FIGS. 6 and 7 are within the intended scope of the present invention. Here, the one shown in FIG. 6 is a liquid crystal display device of a so-called back light type, and the one shown in FIG. 7 is a liquid crystal display device of a so-called front light type. The light-guiding plate 100 shown in FIGS. 6 and 7 has a so-called wedge shape in which the thickness decreases from the one side where light source 200 is disposed towards the opposite side. Specifically, the surface (bottom surface of FIG. 6, upper surface of FIG. 7) opposite to the light-exiting surface 123 is disposed to be slanted. Here, the closed spaces 103 of the light-guiding plates 100 shown in FIGS. 6 and 7 are disposed so that the surface on the light-exiting surface 123 side (upper surface of FIG. 6, bottom surface of FIG. 7) and the surface opposite to light-exiting surface 123 (bottom surface of FIG. 6, upper surface of FIG. 7) will be parallel to light-exiting surface 123. Also, the plurality of closed spaces 103 are disposed so that the number thereof decreases from the one side where light source 200 is disposed towards the opposite side.

Figure 8:
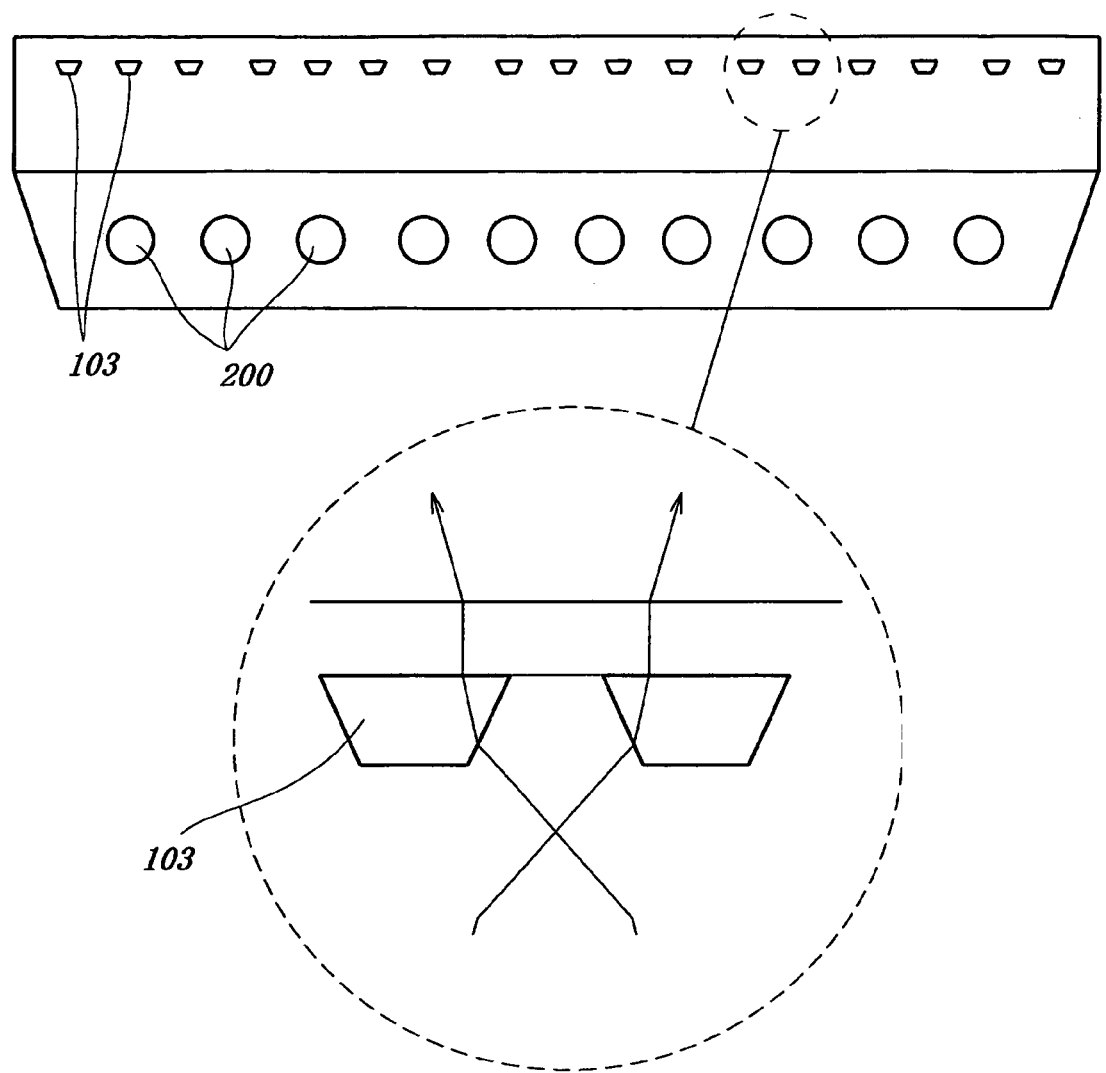

Further, even in the case of using it in a liquid crystal display device as in the above-described embodiment, it can be used in a liquid crystal display device of a so-called plumb-down type such as shown, for example, in FIG. 8. In this case, with the plurality of closed spaces 103, the directivity of the light from the light source can be efficiently changed, and it can be easily controlled to have a directivity that is accurate as a display device. Furthermore, in this case, an accurate light quantity distribution can be produced by disposing the plurality of closed spaces 103 while adjusting the state of in-surface distribution in plan view (when viewed as in FIG. 3).

Figure 9:
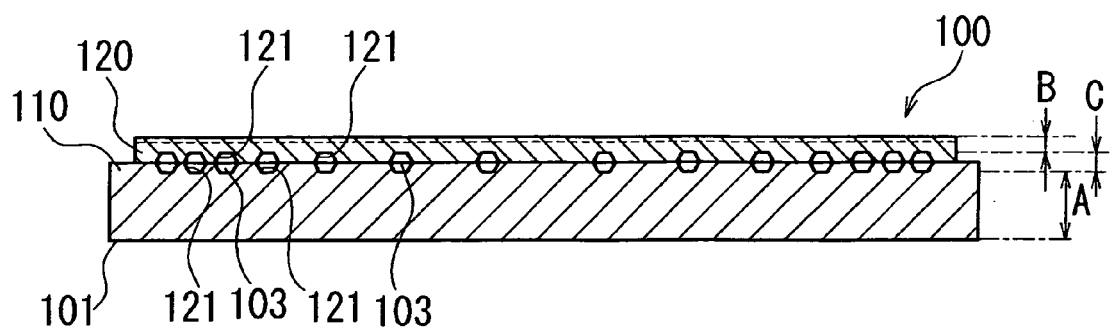
Figure 10:
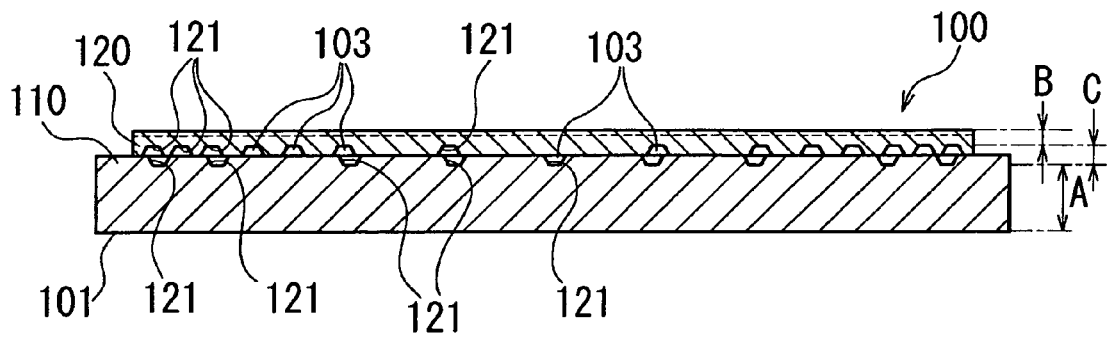
Figure 11:
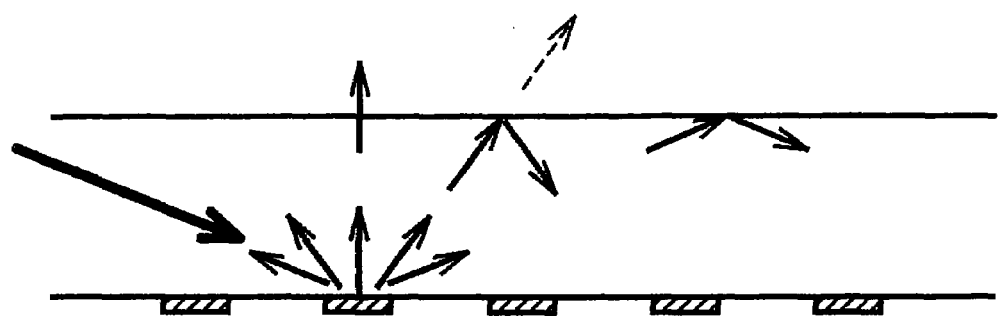
FIG. 11 shows a light guiding plate that has undergone a treatment such as printing or embossing on a surface opposite to the display surface.

Further, in the aforesaid embodiment, the one in which the closed spaces 103 are formed with recesses 121 formed in the second member 200 has been described; however, the present invention is not limited to this. For example, forming recesses for forming closed spaces in the first member 110 as in the aforesaid embodiment or forming closed spaces with holes by allowing the third member having holes to intervene between the first member and the second member are within the scope intended by the present invention. Furthermore, as shown in FIG. 9 or FIG. 10, forming recesses 121 for forming closed spaces 103 in both of the first member 110 and the second member 120 is within the scope intended by the present invention. Here, in forming recesses 121 both in the first member 110 and the second member 120 in this manner, the plurality of recesses 121 of the first member 110 can be disposed at positions corresponding to the plurality of recesses 121 of the second member 120 so that one closed space 103 may be formed with one recess 121 of the first member 110 and one recess 121 of the second member 120, as shown in FIG. 9. Furthermore, in forming recesses 121 both in the first member 110 and in the second member 120, change in design can be made so that some recesses 121 among the plurality of recesses 121 of the first member 110 may form closed spaces 103 together with the front surface of the second member 120, or some recesses 121 among the plurality of recesses 121 of the second member 120 may form closed spaces 103 together with the back surface of the first member 110, as shown in FIG. 10, instead of disposing the plurality of recesses 121 of the first member 110 at positions corresponding to the plurality of recesses 121 of the second member 120.

The invention claimed is:

1. A liquid crystal display device having a surface radiation conversion element for converting an electromagnetic wave, which is radiated from a radiation source, to surface radiation, characterized in that an element body has a generally plate shape constituted with a material having a larger electric permittivity than air outside said element body and, in the inside of the element body, a plurality of recesses formed in one surface of said element body form completely closed spaces of substantially uniform size on said one surface and whose electric permittivity is smaller than that of the material constituting the element body and whose surfaces opposite to a radiation surface are generally flat, wherein a number of said completely closed spaces near an edge of the element body near the radiation source is of greater density than the density of said completely closed spaces in a central portion of the element body.

2. The liquid crystal display device according to claim 1, characterized in that a plurality of said completely closed spaces are disposed whose surfaces opposite to said radiation surface are generally parallel to the radiation surface.

3. The liquid crystal display device according to claim 1, characterized in that a plurality of said completely closed spaces are adjacently disposed whose surfaces opposite to said radiation surface are generally parallel to each other.

4. The liquid crystal display device according to claim 1, characterized in that a first member having a radiation source disposed on a side thereof and a second member disposed on the radiation surface side are constituted to be bonded together in close adhesion, and said completely closed spaces are formed between said first member and said second member by the adhesion of faces of said first and second member.

5. The liquid crystal display device according to claim 4, characterized in that at least one member of said first member and said second member has recesses formed therein, and said recesses are disposed to constitute said completely closed spaces by joining faces of said first member and said second member.

6. The liquid crystal display device according to claim 1, characterized in that a total reflection restraining layer such as a scattering layer is disposed in the radiation surface.

7. The liquid crystal display device according to claim 1, characterized in that said completely closed spaces are filled with solid layers having a smaller electric permittivity than the material constituting the element body.

8. The liquid crystal display device according to claim 1, characterized in that a first member having a radiation source disposed on a side thereof and a second member disposed on a radiation surface of the first member are constituted to be in close adhesion, the second member including a planar surface having a plurality of openings therein, wherein face contact between the second member planar surface and the first member completely closes the spaces in the second member.

9. A liquid crystal display device having a surface radiation conversion element, characterized in that an element body of the surface radiation conversion element has a generally plate shape constituted with a material having a larger electric permittivity than air outside said element body and, in the inside of the element body, a plurality of recesses formed in one surface of said element body form completely closed spaces on said one surface and whose electric permittivity is smaller than that of the material constituting the element body and whose surfaces opposite to a radiation surface are generally flat, wherein a number of said completely closed spaces near an edge of the element body near a radiation source is of a greater density than the density of said completely closed spaces in a central portion of the element body.

10. The liquid crystal display device according to claim 9, characterized in that a plurality of said completely closed spaces are disposed whose surfaces opposite to said radiation surface are generally parallel to the radiation surface.

11. The liquid crystal display device according to claim 9, characterized in that a plurality of said completely closed spaces are adjacently disposed whose surfaces opposite to said radiation surface are generally parallel to each other.

12. The liquid crystal display device according to claim 9, characterized in that a first member having a radiation source disposed on a side thereof and a second member disposed on the radiation surface side are constituted to be bonded together in close adhesion, and said completely closed spaces are formed between said first member and said second member.

13. The liquid crystal display device according to claim 9, characterized in that at least one member of said first member and said second member has recesses formed therein, and said recesses are disposed to constitute said completely closed spaces by joining faces of the first member and the second member.

14. The liquid crystal display device according to claim 13, characterized in that a total reflection restraining layer such as a scattering layer is disposed in the radiation surface.

15. The liquid crystal display device according to claim 9, characterized in that said completely closed spaces are filled with solid layers having a smaller electric permittivity than the material constituting the element body.

16. The liquid crystal display device according to claim 9, characterized in that a first member having a radiation source disposed on a side thereof and a second member disposed on a radiation surface of the first member are constituted to be in close adhesion, the second member including a planar surface having a plurality of openings therein, wherein face contact between the second member planar surface and the first member completely closes the spaces in the second member.

17. A method of producing a surface radiation conversion element of a liquid crystal display device for converting electromagnetic radiation from a radiation source to surface radiation, comprising the steps of:
providing a first member having a first electric permittivity and a second member having a second permittivity generally equal to the first electric permittivity, wherein a plurality of recesses of substantially uniform size are formed in a surface of at least one of the first member and the second member, the density of a number of said recesses near an edge of the element body near the radiation source being greater than the density of a number of recesses in a central portion of the element body; and
connecting the surface of the second member to the surface of the first member to completely close the recesses;
whereby the recesses have a smaller electric permittivity than the first electric permittivity and the second electric permittivity.

18. The method of producing a surface radiation conversion element according to claim 17, characterized in that
said first member is constituted with a plate material such as an acrylic light guide,
said second member is constituted with a sheet member such as a diffusion sheet containing polycarbonate as a principal material, and
said first member and said second member rejoined by adhesion.

19. The method of producing a surface radiation conversion element according to claim 17, characterized in that said recesses are formed in one member of the first member and the second member, and a joining surface of the other member to which the one member having said recesses formed therein is joined is formed to be generally coplanar.

20. The method of producing a surface radiation conversion element according to claim 17, characterized in that a total reflection restraining layer such as a diffusion layer is formed in said first member or said second member in a surface opposite to the joining surface.

21. The method of claim 17 including the additional step of filling the recesses with a solid material having an electric permittivity less than the first electric permittivity.

22. The method of claim 17 including the additional step of filling the recesses with a gas having an electric permittivity less than the first electric permittivity.

23. A liquid crystal display device having a surface radiation conversion element for converting an electromagnetic wave, which is radiated from a radiation source, to surface radiation, comprising an element body having a generally plate shape constituted with a material having a larger electric permittivity than air outside said element body and, in the inside of the element body, a plurality of completely closed spaces are disposed, the electric permittivity of said completely closed spaces being smaller than the electrical permittivity of the material constituting the element body, and a number of the completely closed spaces near an edge of the element body near the radiation source being of a greater density than in a central portion of the element body,
wherein said element body comprises a first member having a first side facing a radiation source and a planar second side and a second member having a planar side having a plurality of openings formed in said second member planar side and having generally flat bottoms, said second member planar side being directly mounted on said first member planar side with portions of said second member planar side in face contact with said first member planar second side thereby completely closing said plurality of openings.

24. A liquid crystal display device having a surface radiation conversion element for converting electromagnetic wave, which is radiated from a radiation source, to surface radiation, comprising an element body having a generally plate shape constituted with a material having a larger electric permittivity than air outside said element body and, in the inside of the element body, a plurality of completely closed spaces are disposed whose electric permittivity is smaller than that of the material constituting the element body and whose surfaces opposite to a radiation surface are generally flat, the element body comprising a first member having a radiation source disposed on a side thereof and a second member disposed on the radiation surface side in close adhesion with the first member, said completely closed spaces being formed from recesses formed in the flat surfaces in both said first member and in said second member by the close adhesion of the first member and the second member flat surfaces.

25. The liquid crystal display device of claim 24 wherein at least some of said completely closed spaces in said first member are aligned with at least some of the completely closed spaces in said second member.

26. The liquid crystal display device of claim 24 wherein at least some of said completely closed spaces in said second member partially overlap at least some of said completely closed spaces in said first member.

27. The liquid crystal display device of claim 24 wherein at least some of said completely closed spaces in said second member are offset from all completely closed spaces in said first member.

28. The liquid crystal display device according to claim 24, wherein a plurality of the completely closed spaces include surfaces opposite to said radiation surface that are generally parallel to the radiation surface.

29. The liquid crystal display device according to claim 24, wherein a plurality of the completely closed spaces include surfaces opposite to said radiation surface that are generally parallel to each other.

30. A liquid crystal display device having a surface radiation conversion element, wherein an element body of the surface radiation conversion element has a generally plate shape constituted with a material having a larger electric permittivity than air outside said element body and, in the inside of the element body, a plurality of completely closed spaces are disposed whose electric permittivity is smaller than that of the material constituting the element body and whose surfaces opposite to a radiation surface are generally flat, the element body comprising a first member having a radiation source disposed on a side thereof and a second member disposed on the radiation surface side in close adhesion with the first member, said completely closed spaces being formed from recesses formed in flat surfaces of both said first member and in said second member by the close adhesion of the first and the second member flat surfaces.

31. The liquid crystal display device of claim 30 wherein at least some of said completely closed spaces in said first member are aligned with at least some of the completely closed spaces in said second member.

32. The liquid crystal display device of claim 30 wherein at least some of said completely closed spaces in said second member partially overlap at least some of said completely closed spaces in said first member.

33. The liquid crystal display device of claim 30 wherein at least some of said completely closed spaces in said second member are offset from all completely closed spaces in said first member.

34. The liquid crystal display device according to claim 30, wherein a plurality of the completely closed spaces include surfaces opposite to said radiation surface that are generally parallel to the radiation surface.

35. The liquid crystal display device according to claim 30, wherein a plurality of the completely closed spaces include surfaces opposite to said radiation surface that are generally parallel to each other.

36. A method of producing a liquid crystal display device having a surface radiation conversion element for converting electromagnetic radiation from a radiation source to surface radiation, comprising the steps of:
provinding a first member having a first electric permittivity and a second member having a second permittivity generally equal to the first electric permittivity, wherein a plurality of recesses are formed both in a surface of the first member and in a surface of the second member; and
connecting the surface of the second member directly to the surface of the first member to completely close the recesses in the first member and the recesses in the second member to form closed spaces;
whereby the recesses have a smaller electric permittivity than the first electric permittivity and the second electric permittivity.

37. The method of claim 36 wherein said step of connecting the second member to the first member comprises the step of aligning at least some of the recesses in the first member with at least some of the recesses in the second member.

38. The method of claim 36 wherein said step of connecting the second member to the first member comprises the step of overlapping at least some of the recesses in the first member with at least some of the recesses in the second member.

39. The method of claim 36 wherein said step of connecting the second member to the first member comprises the step of aligning at least some of the recesses in the first member with an area of the second member having no recesses.

* * * * *